United States Patent
Bauer et al.

(10) Patent No.: US 6,169,796 B1
(45) Date of Patent: Jan. 2, 2001

(54) CALL REROUTER METHOD AND APPARATUS

(75) Inventors: Thomas Michael Bauer, Belle Mead; Duane Oliver Bowker, Tinton Falls; Christopher P. Gilboy, Freehold, all of NJ (US)

(73) Assignee: AT & T Corp., New York, NY (US)

( * ) Notice: Under 35 U.S.C. 154(b), the term of this patent shall be extended for 0 days.

(21) Appl. No.: 09/036,922

(22) Filed: Mar. 9, 1998

(51) Int. Cl.[7] .................................................. H04M 3/42
(52) U.S. Cl. ........................ 379/215; 379/212; 370/352
(58) Field of Search .................................. 379/215, 210, 379/212, 230; 370/352, 389, 392

(56) References Cited

U.S. PATENT DOCUMENTS

| | | |
|---|---|---|
| 4,995,074 | 2/1991 | Goldman et al. . |
| 5,274,700 | 12/1993 | Gechter et al. . |
| 5,363,431 | 11/1994 | Schull et al. . |
| 5,428,608 | 6/1995 | Freeman et al. . |
| 5,533,110 | 7/1996 | Pinard et al. . |
| 5,712,907 | 1/1998 | Wegner et al. . |
| 5,724,412 | 3/1998 | Srinivasan . |
| 5,742,596 | 4/1998 | Baratz et al. . |
| 5,751,706 | 5/1998 | Land et al. . |
| 5,768,513 | 6/1998 | Kuthyar et al. . |
| 5,805,587 | 9/1998 | Norris . |
| 5,870,565 | 2/1999 | Glitho . |
| 5,894,504 | 4/1999 | Alfred et al. . |
| 5,896,444 | 4/1999 | Perlman et al. . |
| 5,916,302 | 6/1999 | Dunn et al. . |
| 5,946,381 | 8/1999 | Danne et al. . |
| 6,011,909 | 1/2000 | Newlin et al. . |

FOREIGN PATENT DOCUMENTS

| | | |
|---|---|---|
| 0758175A1 | 2/1997 | (EP) . |
| WO/95/18501 | 7/1995 | (WO) . |
| WO97/14238 | 4/1997 | (WO) . |
| WO97/16007 | 5/1997 | (WO) . |
| WO97/37483 | 10/1997 | (WO) . |
| WO9747118 | 12/1997 | (WO) . |
| WO98/01985 | 1/1998 | (WO) . |

OTHER PUBLICATIONS

U.S. application No. 08/562,567, filed on Nov. 27, 1995, Norris et al.
U.S. application No. 08/625,963, filed Apr. 1, 1996, Foladare et al.
*Bell System Technical Journal,* Oct., 1980, pp. 1397–1416, "Traffic Service Position System No. 1: Busy Line Verification Feature" by J. Atkins, et al.
Colin Low, The Internet Telephony Red Herring, Jun., 1996, p. 15.
'Diversification and Integration of Networks and Switching Technologies Towards the 21$^{st}$ Century', Oct. 25–30, 1992, vol. 2, 15 Pages.
R Babbage et al, Internet Phone—Changing the Telephony Paradigm. 17 Pages.

*Primary Examiner*—Creighton Smith (57) ABSTRACT

A call rerouter routes a call through a data link when a called party is engaged in a data call. The call rerouter evokes a "T" connection in a switch that is in a connection path of the called party's call and determines whether the called party is engaged in a data call or a non-data call. If engaged in a data call, the rerouter retrieves called party information to determine if the called party is a subscriber to a data network such as an Internet Service Provider (ISP). If so, the call rerouter informs the called party through the data network that a call is waiting to be connected. If the called party desires, the rerouter routes the call through the data network to be connected with the called party. If the called party is not a subscriber to an ISP (or data network) or not engaged in a data call, the call rerouter returns a message to the calling party that the called party is unavailable.

12 Claims, 7 Drawing Sheets

CALL REROUTER METHOD AND APPARATUS

BACKGROUND OF THE INVENTION

1. Field of Invention

The present invention is directed to a call rerouter for calls directed to a terminal engaged in a data call. More specifically, the present invention is directed to a system and method that determines if a called party is involved in a data call and, if so, allows the call to be redirected through a data network to the called party.

2. Description of Related Art

Conventionally, when one party calls another party who is off-hook, the calling party receives a busy signal. The busy signal is an indication to the caller that the called party's telephone station is unable to accept their telephone call at that time. Thus, the telephone call cannot be completed.

A call waiting service is effective when the called party is engaged in an analog voice connection but is not effective when the called party is involved in a data call, such as being logged onto the Internet through a modem connection. Typically, the call waiting service is disabled (e.g. by entering *70) when the data call is initiated. However, if call waiting is not disabled, the data call may be disconnected when another call attempts to be connected and loss of data may occur. Thus, there is a need for a new technology to handle calls to a party engaged in a data call.

SUMMARY OF THE INVENTION

A call rerouter reroutes a call through a data link when a called party is engaged in a data call. The call rerouter evokes a "T" connection in a switch that is in the connection path of the called party's call and determines whether the called party is engaged in a data call or a non-data call. If engaged in a data call as detected by the invention, the rerouter retrieves called party information to determine if the called party is a subscriber to a data network such as an Internet Service Provider (ISP). If so, the call rerouter informs the called party through the data network that a call is waiting to be connected. If the called party desires, the call rerouter routes the call through the data network to be connected with the called party.

If the called party is not a subscriber to an ISP (or data network) or not engaged in a data call, the call rerouter returns a message to the calling party that the called party is unavailable or returns the traditional busy signal.

BRIEF DESCRIPTION OF THE DRAWINGS

The preferred embodiments of this invention will be described in detail, with reference to the following figures, wherein like numerals reference like elements, and wherein.

DETAILED DESCRIPTION OF PREFERRED EMBODIMENTS

Figure 1:
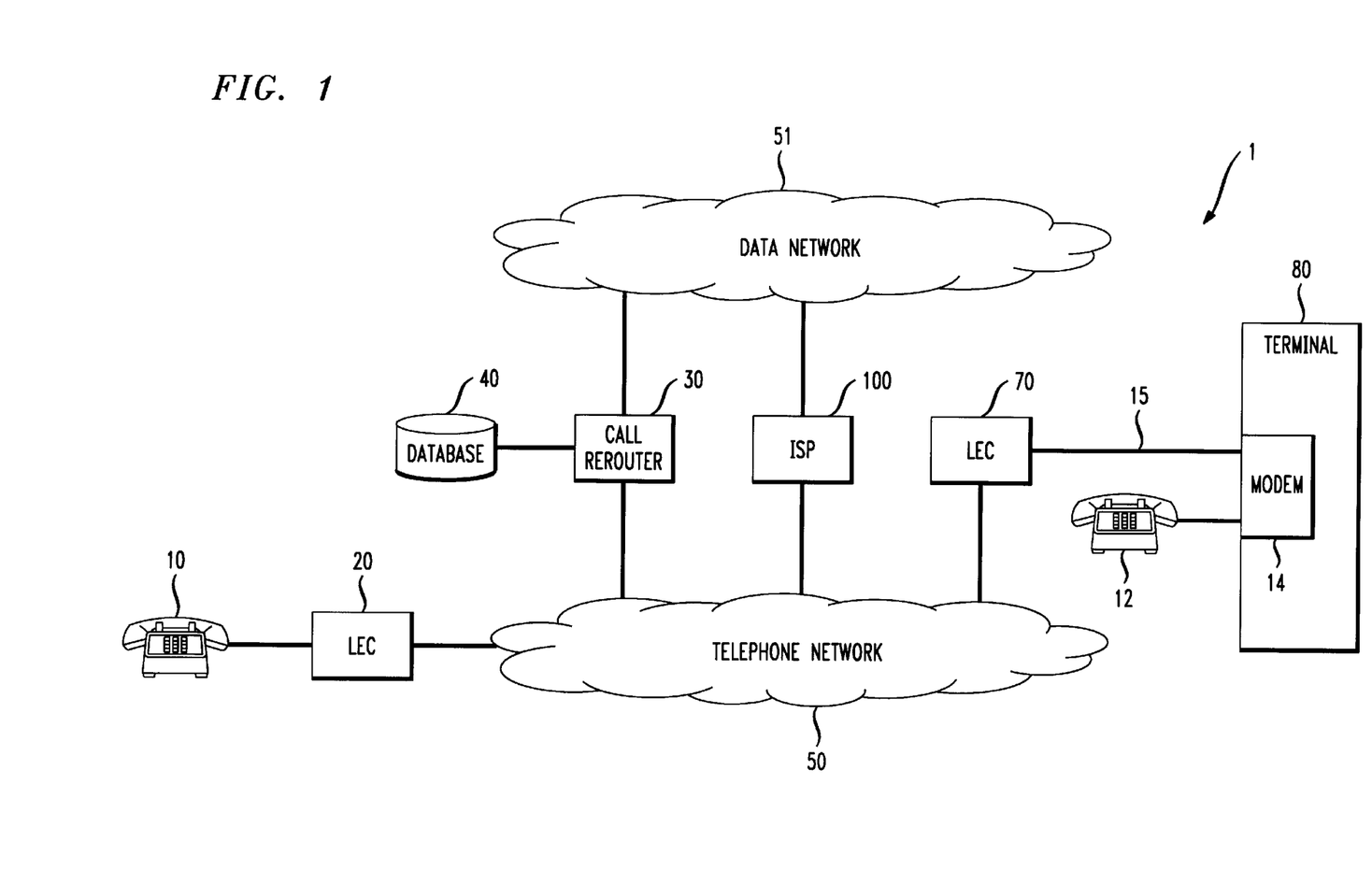
FIG. 1 is a block diagram of an exemplary embodiment of a call rerouter system.

FIG. 1 is a block diagram showing a call rerouter system 1. The call rerouter system 1 includes a telephone network 50 and a data network 51. Telephone stations 10 and 12 are coupled to the telephone network 50 through Local Exchange Carriers (LEC) 20 and 70. The telephone station 12 is coupled to the LEC 70 through either a modem 14 of a terminal 80 (shown in FIG. 1) or through a direct connection to line 15 (not shown). The modem 14 also couples the terminal 80 to the telephone network 50.

An Internet Service Provider (ISP) 100 is coupled to both the telephone network 50 and the data network 51. The ISP 100 provides data network service to ISP subscribers by receiving telephone calls from the telephone network 50 and connecting the telephone call to the data network 51 as a data call. The signals transmitted from the ISP 100 to the modem 14, for example, contain data signals which may be distinguished from voice signals through appropriate signal processing as embodied in this invention.

Figure 2:
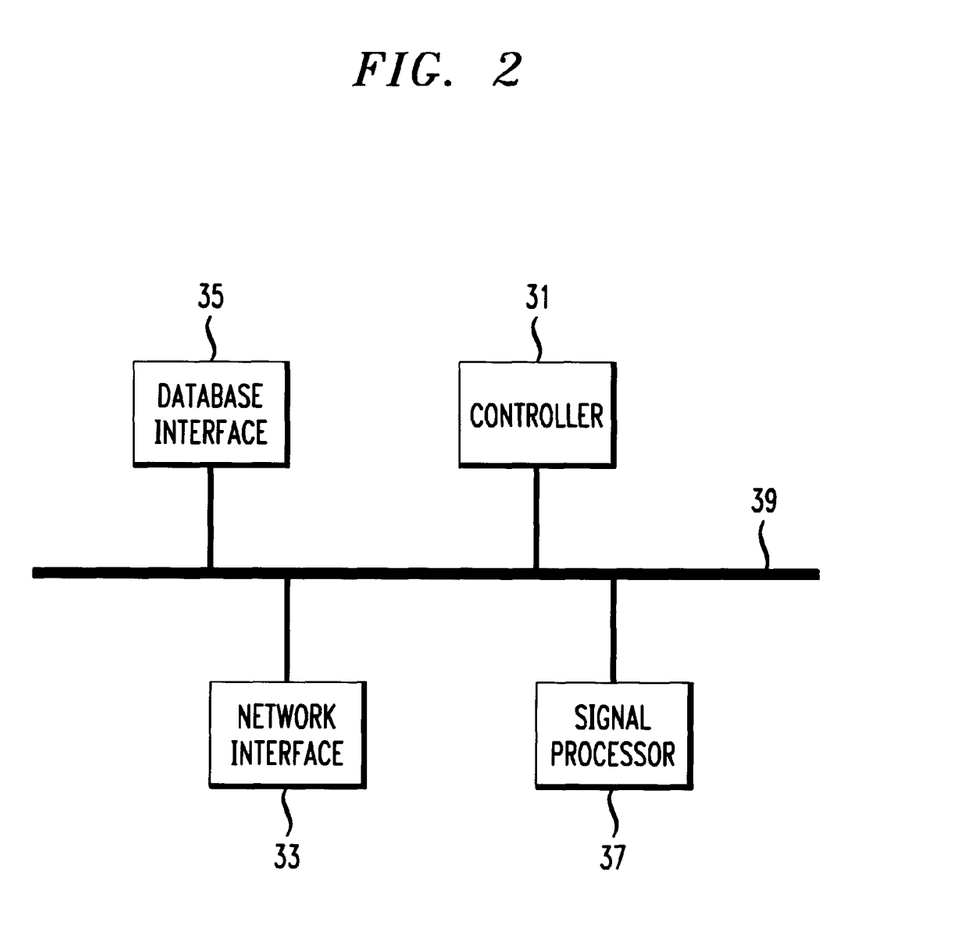
FIG. 2 is a block diagram of the call rerouter of FIG. 1.

A call rerouter 30 is also coupled to both the data network 51 and the telephone network 50. FIG. 2 shows a block diagram of the call rerouter 30. As shown in FIG. 2, the call rerouter 30 includes a controller 31, a network interface 33, a database interface 35 and a signal processor 37. The controller 31 communicates to other device on the network 50 through the network interface 33 and retrieves information from the database 40 via the database interface 35. Whether a called party or calling party is a subscriber may be determined by checking the party's identification code (such as their telephone number) against entries in database 40 that designate subscribers and non-subscribers.

Programs stored in a memory (not shown) are executed by the controller 31 to perform required functions. This memory may be a RAM, ROM, hard disk, floppy disk, magnetic tape, or the like.

The signal processor 37 performs signal processing to distinguish a data call from a voice call and returns the results of the signal processing to the controller 31 as will be described more fully below. Each of the elements 31, 33, 35 and 37 are connected by way of a communications bus 39 which may be a SCSI bus, local bus, Ethernet, LAN, WAN or the like.

When a call is directed to a subscriber at the terminal 80 or telephone station 12, determined by a lookup in database 40 of the called party's identification code, for example, the call is received by the call rerouter 30 based on the called party at terminal 80 being a subscriber to the call rerouting service. The call rerouter 30 first determines if the subscriber's terminal 80 (or telephone station 12) is busy. To determine if subscriber's terminal 80 is busy, the call rerouter 30 detects whether an out of band signal is sent from LEC 70 switch to the controlling switch in the carrier's network which may be the LEC 20 switch, indicating that the line is busy.

If not busy, the call rerouter 30 routes the call to the telephone station 12 and releases control. However, if busy, then the call rerouter 30 determines if the subscriber (terminal 80 or telephone station 12) is engaged in a data call.

If the subscriber, i.e. the called party, is engaged in a data call, then the call rerouter 30 retrieves subscriber information from a database 40 to identify a data network ID (such as an IP address) for the subscriber. Once identified, the call rerouter 30 sends a message to the subscriber at terminal 80, for example, through the data network 51 to alert the subscriber of the call. The message may include identifying information about the calling party, such as their name, telephone number, or the like so that the subscriber may decide whether they wish to communicate with that particular calling party.

In order to receive the message sent from the call rerouter 30, the subscriber may be provided with custom software that recognizes the messages being sent from the call rerouter 30. For example, the software may be a background application that is initiated when the subscriber runs his/her data communications software (such as a plug-in application for the Netscape™ Internet browser software). Thus, in this example implementation, the software may maintain an open TCP/IP port for receiving call rerouter 30 messages which are then output to the subscriber via his/her terminal 80. Alternatively, these functions may be performed by a separate device that is in communication with the subscriber's terminal 80 and the communications line 15. The above would also be performed if the subscriber is the calling party.

The messages from the call rerouter 30 may include the option of accepting the call, declining the call, or sending a reply message to the calling party. If the subscriber decides to accept the call, the call rerouter 30 reroutes the call through the data network and connects the subscriber to the call. Otherwise, if the called party declines the call, a signal is sent back to the call rerouter 30 to broadcast a prerecorded or synthesized audible message to the calling party that the called party is unavailable. For example, the message "The party you are calling is not available to take your call. Please call back at a later time" or the like, may be broadcast to the calling party.

Similarly, if the called party decides to send a reply message, the subscriber may be provided with a menu of optional messages that may be sent back to the calling party. For example, the subscriber may send the message "I am on the Internet, please call back in 5 minutes", "I will log off and call you in 5 minutes" or the like.

Figure 3:
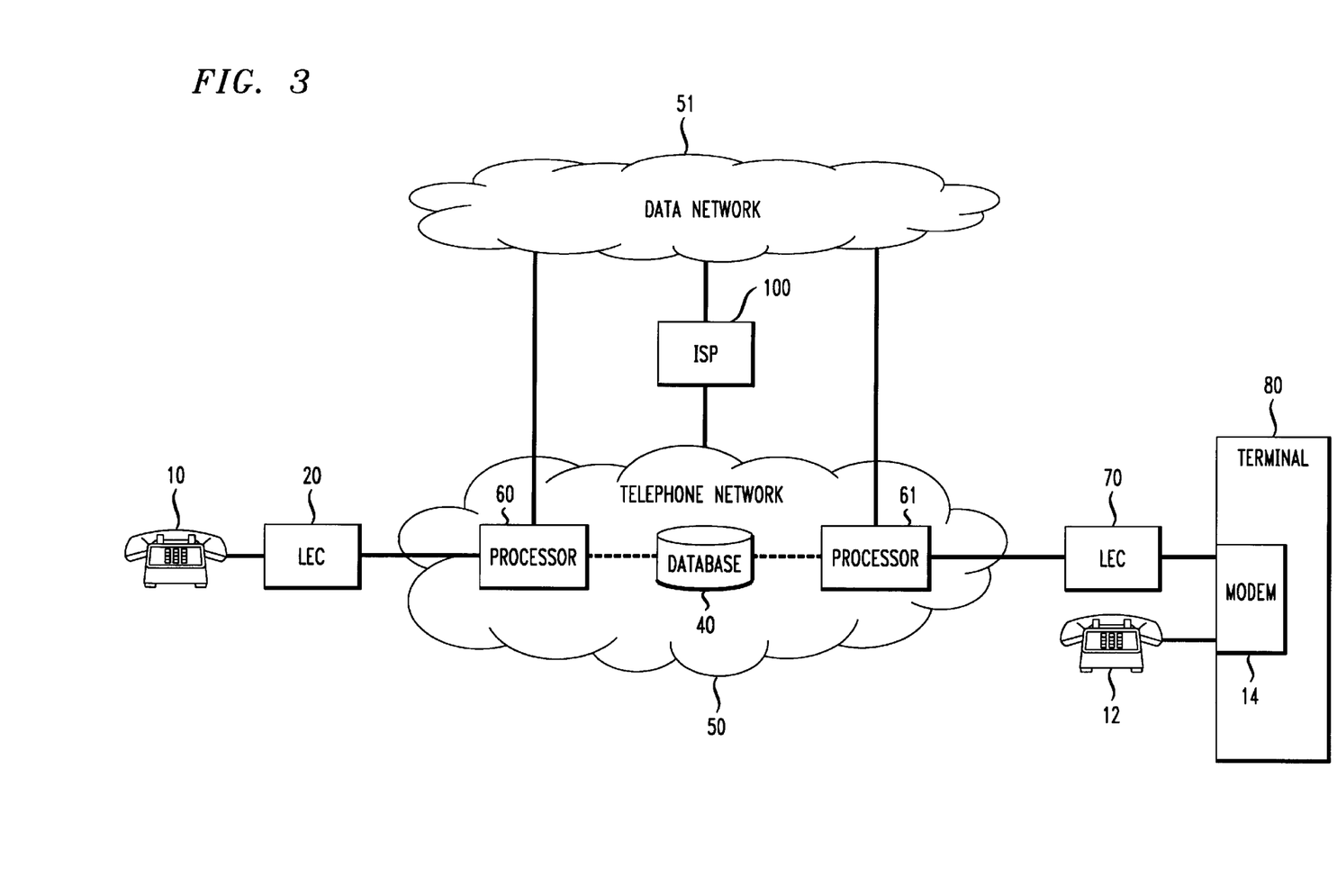
FIG. 3 is a block diagram of another exemplary embodiment of a call rerouting system.

In the embodiment shown in FIG. 1, the call rerouter 30 is an independent device connected to telephone network 50 and data network 51. However, as shown in FIG. 3, the call rerouter 30 may be incorporated into a distributed system of processors 60, 61 in telephone network 50. In the embodiment shown in FIG. 3, each of the processors 60 and 61 is connected with data network 51 and has access to database 40 which contains the necessary information for processing and routing calls through the networks 50 and 51. For example, database 40 may include information about the called party such as an identification code, whether the called party subscribes to an ISP, information about the ISP (such as access number and the like), the IP address of the called party, and the like.

The processors 60 and 61 are further connected to LECs 20 and 70 respectively. The LECs 20 and 70 perform call routing and processing functions on the telephone calls at a local level. The LECs 20 and 70 are typically systems owned and run by local telephone companies. The LEC 20 routes the call from telephone station 10 to the network 50. LEC 70 routes the call from the network 50 to the terminal 80 (or telephone station 12). This process can be reversed when terminal 80 (or telephone station 12) becomes the calling party and telephone station 10 becomes the called party.

For simplicity, the following description of the invention will assume a centralized call rerouter 30 as shown in FIG. 1. It should also be noted that while FIGS. 1 and 3 show only the telephone station 10 and the terminal 80. As is well known, telecommunications networks typically have hundreds or thousands of service subscribers, any of which may be a calling or called party. Only the telephone station 10 and terminal 80 are depicted in order to simplify the description of the invention.

The network 50, inclusive of the LEC 20, further includes at least one "T" connection device for establishing a "T" connection in the connection path between terminal 80 and ISP 100. This "T" connection may be established at any point along the connection path between the terminal 80 and ISP 100. The "T" connection device allows for unintrusive analysis of the signals being sent between the terminal 80 and ISP 100. The creation of the "T" connection is well known in the art and is described, for example, in The Bell System Technical Journal, October 1980, pages 1397–1416 which is hereby incorporated by reference.

In the conventional systems, when, for example, the telephone station 10 places a call to the telephone station 12 while the modem 14 is coupled through the telephone line 15 and the terminal 80 is logged onto the ISP 100. As discussed above, in a conventional telephone system, either a busy signal is returned to the telephone station 10 or the modem 14 could be "bumped off" its connection with the ISP 100 if call waiting is active. This undesirable result is avoided by the call rerouter 30 for subscribers to the call rerouter service.

For a subscriber, which may be either the calling party or the called party, the call rerouter 30 sends a signal to an appropriate "T" connection device to establish a "T" connection in the connection path of the terminal 80 instead of returning the busy signal to the telephone station 10 when the LEC 70 returns a busy signal. For this example embodiment, the "T" connection is established in telephone line 15. The "T" connection may be established automatically using software applications that are readily apparent to one of ordinary skill in the art.

Once the "T" connection is established, the call rerouter 30 analyzes the signals to determine whether the telephone line 15 is carrying signals for a data call or a non-data call (voice call). The analysis performed by the call rerouter 30 includes known signal processing methods that are capable of reliably discriminating voice signals from either modulated voiceband data signals or unmodulated baseband data signals (such as with ISDN transmissions). In addition, specific baseband data protocol stacks used by the ISP 100 may be recognized if the traffic is unmodulated baseband data. For example, if the ISP 100 uses ISDN baseband protocol to transport Internet information, High level DataLink Control (HDLC) bit-padding and framing, HDLC flags, or the like may be recognized. In addition, the transport of IP packets within the frame structure of the baseband data may also be recognized.

Examples of the signal processing methods include determining the number of zero crossings, peak-to-average ratio or peak-to-min ratio (high for voice, low for data), the existence of data answer tones, and the like. Any manner in which signals may be analyzed to determine whether they are data or non-data may be used without departing from the spirit and scope of this invention. Once the signal analysis is complete, the "T" connection is terminated.

If the telephone line 15 is carrying non-data call signals, the call rerouter 30 returns a busy signal to the telephone station 10 or sends a message indicating that the called party is not available to take the call. This message may be a prerecorded message, a synthesized voice message, a busy signal or the like. However, if the telephone line 15 is carrying data call signals, then the call rerouter 30 retrieves from the database 40, information regarding the called party and determines whether the called party subscribes to an ISP. If so, the rerouter 30 obtains information relating to the ISP.

In addition, the database 40 may further include the IP address of the called party The IP address may be either permanent or dynamically assigned. If the IP address is dynamically assigned, the call rerouter 30 must contact the called party's ISP to obtain the currently active IP address for the called party. The called party's ISP may be contacted using the information obtained from database 40. A dynamically assigned address may be obtained while the call rerouter 30 interacts with the ISP 100 from a database associated with ISP 100 (not shown) that stores the identifying information of the called party and the called patty's currently active IP address.

Figure 4:
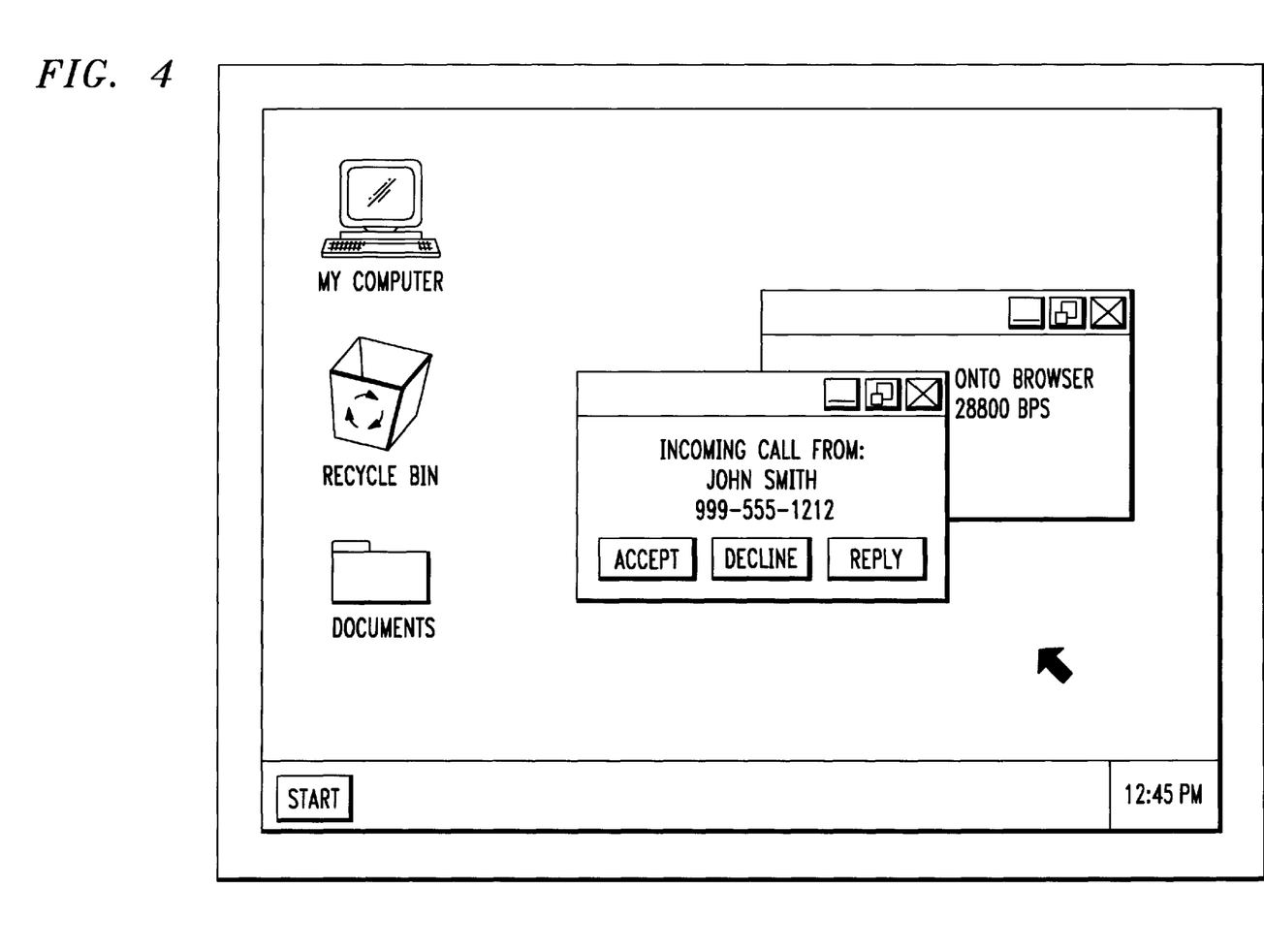
FIG. 4 is an example message display according to one embodiment of the present invention.

Once the IP address for the called party is obtained, the call rerouter 30 sends a message to the called party's terminal 80 using the IP address, via the data network 51, to inform them that a call is waiting. As described above, the reception of the message may be facilitated by custom software running in the background of the called party's Internet browser, by a separate device in communication with the called party's terminal 80 and the communications line 15, or the like. This message may be in the form of a dialog box on a display, an audible message, a text message, a series of tones, or the like. An example of the message display is shown in FIG. 4. The audible messages and series of tones may be broadcast to the called party through audio output devices attached to the called party's terminal 80.

Figure 5:
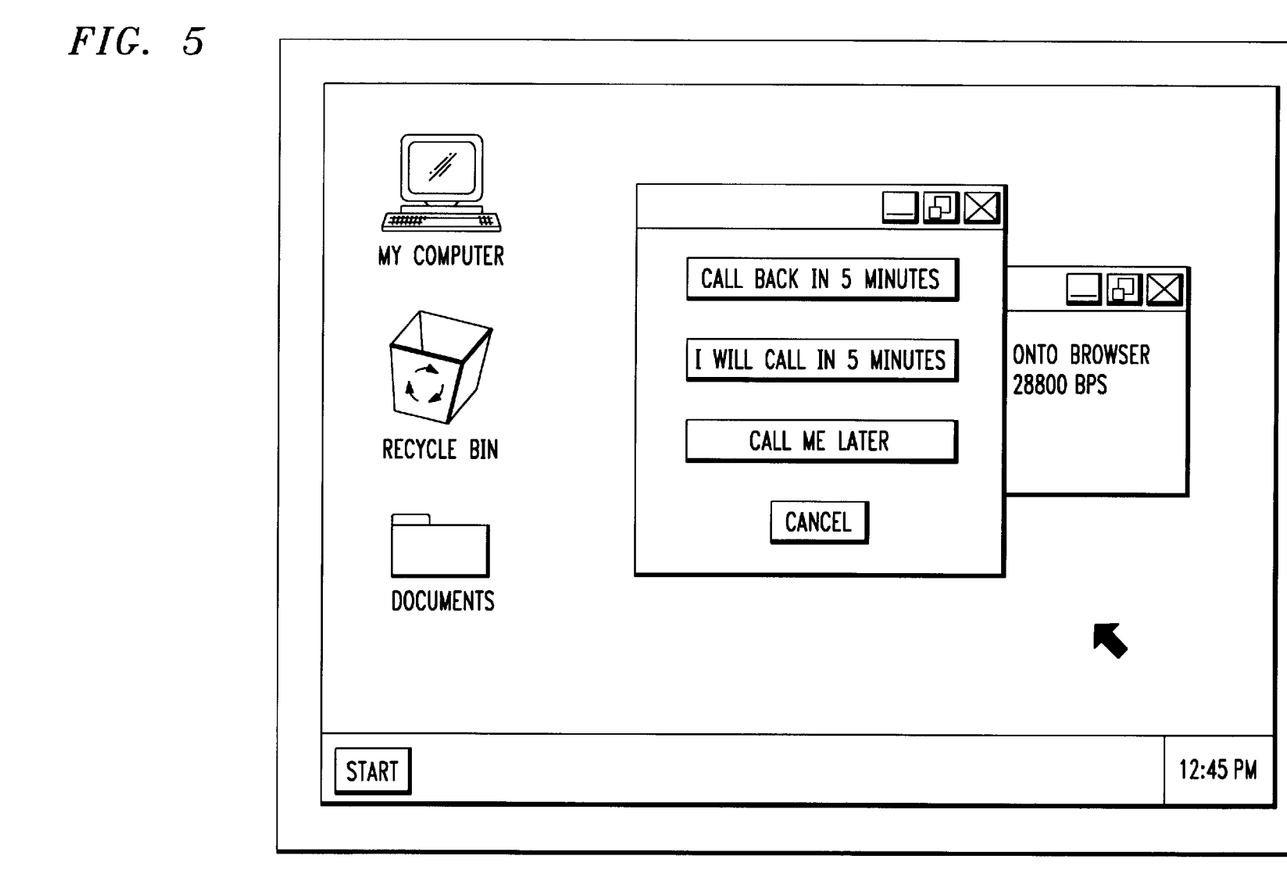
FIG. 5 is an example message reply display according to one embodiment of the present invention.

After receiving the message that a call is waiting, the called party may accept the call, decline the call, or send a reply message by pressing the appropriate graphical buttons associated with a displayed dialog box using a pointing device, for example. An example of the message reply display is shown in FIG. 5. Other means, such as audible commands using voice recognition techniques, may also be used to either accept, decline or send a reply message. If the called party declines the call, either a busy signal or a message is sent to the calling party 10 informing them that the called party is not available to accept the call.

If the called party accepts the call, the call is routed through a telephony device of the call rerouter 30 and data network 51 to the called party without interrupting the data connection of the called party to the ISP 100. The telephony device converts the analog voice telephone signals into data packets that may be transmitted through data network 51 and converts data packets received into analog voice telephone signals that may be output at telephone station 10. In this way, the calling party is able to carry on a conversation with the called party over the data network without interrupting the data connection of the called party. The telephony device may be incorporated into the signal processor 37 of the call rerouter 30 or may be a separate device within the call rerouter 30 or an external device coupled to the call rerouter 30.

The notification and acceptance of a waiting call may also be performed in a manner as disclosed in commonly assigned co-pending U.S. patent application Ser. Nos. 08/562,678 and 08/625,963, the disclosures of which are hereby incorporated by reference. U.S. patent application Ser. No. 08/562,678 discloses a facility to alert a subscriber whose telephone station set is connected to the Internet of a waiting call via the Internet connection without interrupting the subscriber's Internet connection. U.S. patent application Ser. No. 08/625,963 discloses a system and method for notifying a user of a waiting call and allowing the user to place the Internet call on hold to accept the waiting call. Both approaches, or a combination of these, may be used with the present invention.

Figure 6:
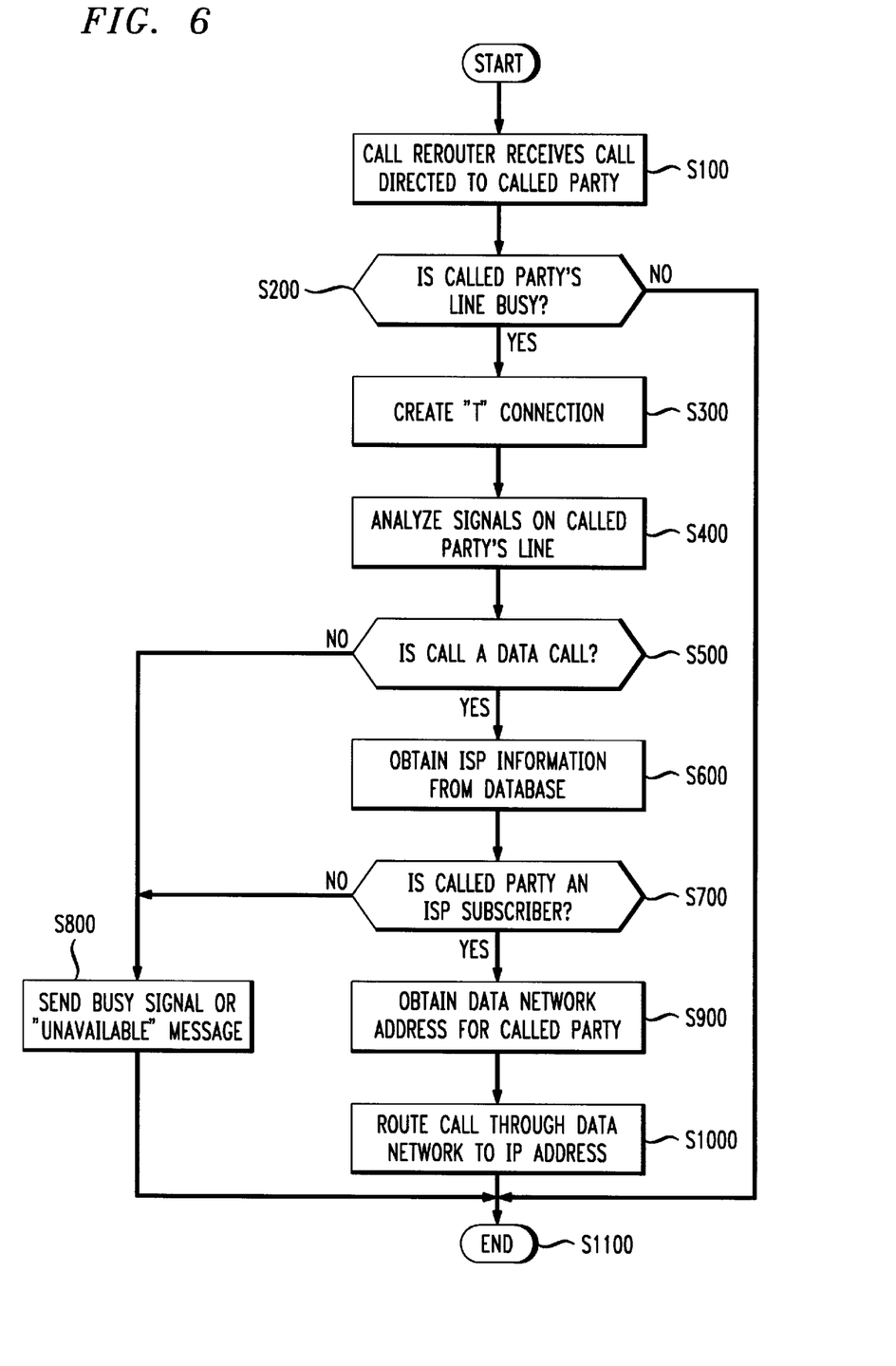
FIG. 6 is a flowchart of a call rerouter process.

FIG. 6 is a flowchart of a call rerouter process. The call rerouter process is performed if either the called party or the calling party is a subscriber to the call rerouter service.

In step S100, the call rerouter 30 receives a call directed to the called party, routes the call through the telephone network 50 to the called party (either terminal 80 or telephone station 12) and goes to step S200. In step S200, the call rerouter 30 determines if the called party's line is busy using an out of band busy signal detection method. If the line is not busy, the call is connected in the conventional manner through the telephone network 50 and the call rerouter 30 goes to step S1100 and ends the process. Otherwise, when a busy signal is returned, the call rerouter 30 goes to step S300.

In step S300, the call rerouter 30 sends a command to an appropriate "T" connection device causing a "T" connection to be created in the connection path of the called party and goes to step S400. In step S400, the call rerouter 30 analyzes the signals received from the "T" connection, determines if the signals are representative of a data call or a non-data call and goes to step S500. Once the signals are analyzed, the "T" connection is released. In step S500, the call rerouter 30 goes to step S600 if the called party is involved in a data call; otherwise, the call rerouter goes to step S800.

In step S600, the call rerouter 30 retrieves called party information, including the called party's ISP, from the database 40 and goes to step S700. In step S700, the call rerouter 30 goes to step S800 if the called party is not an ISP subscriber; otherwise, the call rerouter goes to step S900. In step S800, the call rerouter 30 returns either a busy signal or a "called party is unavailable" message and goes to step S1100 and ends.

In step S900, the call rerouter 30 obtains the IP address for the called party and goes to step S1000. The IP address may be obtained from the database 40 or from a memory or database in ISP 100. Thus, if the IP address is dynamically assigned by the ISP 100, the call rerouter 30 retrieves the IP address that the called party is currently using from the ISP 100. The call rerouter 30 may retrieve the IP address by connecting to the ISP 100 and searching for the IP address in the memory or database of the ISP 100 based on information about the called party, such as his/her telephone number, name, login id, and the like.

In step S1000, the call rerouter 30 obtains the IP address and sends an alert signal to the called party's terminal 80 notifying the called party that there is an incoming call. The alert signal may be a displayed message that includes information identifying the calling party and the choice of either accepting the call, declining the call or sending a reply message.

If the called party declines the call, a busy signal or a "called party unavailable" message is sent to the calling party. If the called party chooses to send a reply message, the reply message chosen is returned to the calling party. If the called party chooses to accept the call, the call rerouter 30 routes the call through the data network 51 using a telephony connection to the IP address of the called party. The call is then passed on to the called party through his/her ISP 100 connection. In this way, the called party may receive telephone calls while still being logged on to the data network 51 without interruption. Futhermore, the called party may continue working on the data network 51 while receiving the telephone call.

Figure 7:
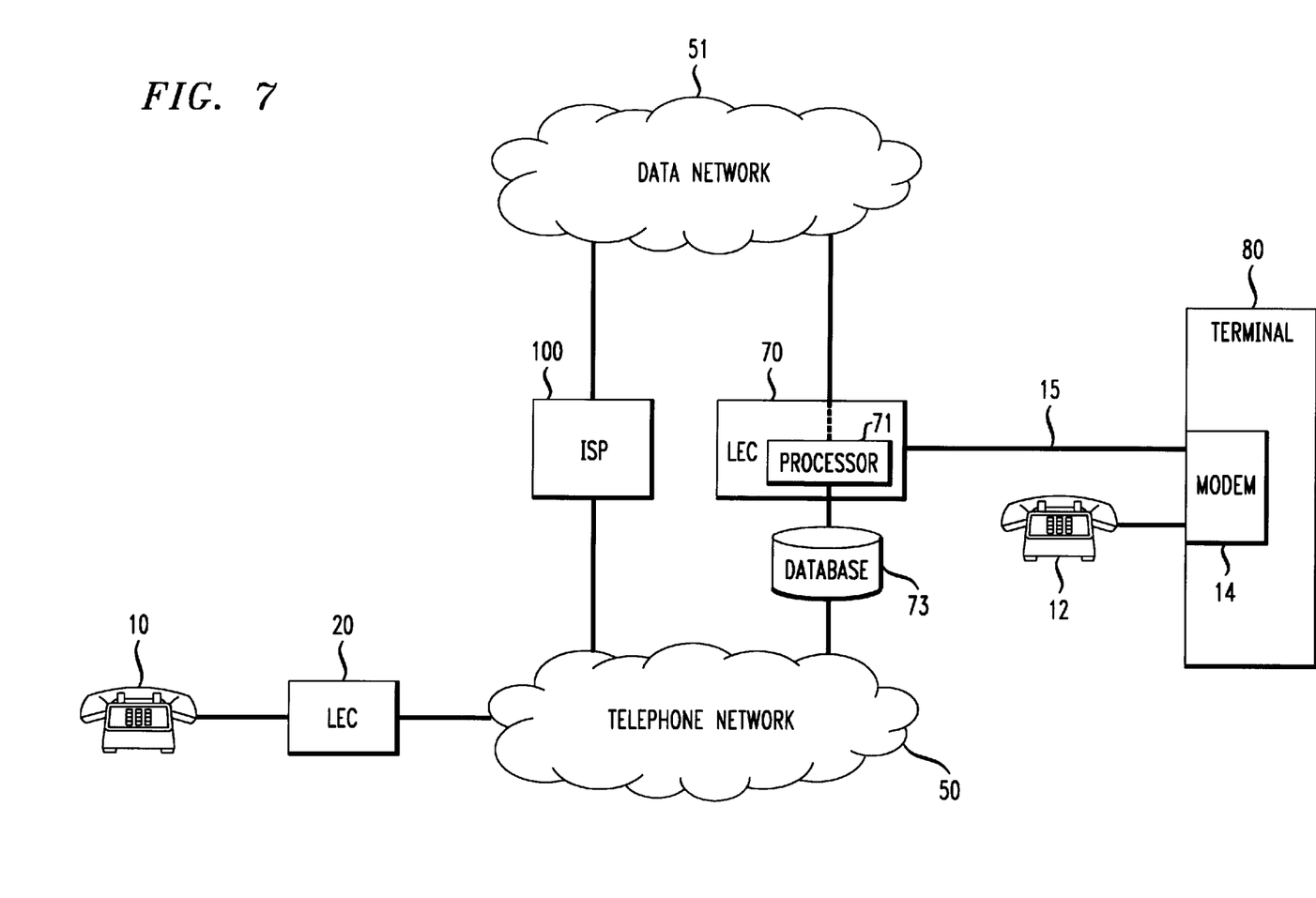
FIG. 7 is a block diagram of an example call rerouter system embodied in a local exchange carrier.

FIG. 7 shows a block diagram of another embodiment of the present invention. This embodiment differs from the first embodiment in that the processing is performed at the LEC 70 level. Thus, as shown in FIG. 7, the LEC 70 includes at least one processor 71 that has access to a database 73. The processing and routing are performed in a similar manner to that of the first embodiment by the processor 71 using database 73.

In another embodiment of the invention, the called party may disable the call rerouter process. In this embodiment, the called party may designate times in which he/she does not wish to be disturbed while logged onto the data network 51. For example, the database 40 may contain a field that designates the times of day, days of the week, and the like that the call rerouting process is to be disabled. When the call rerouter 30 retrieves information from the database 40, it will then retrieve the field containing the "do not disturb" time periods and compare them against the current time. If the current time falls within one of the time periods, then the call rerouter process will be terminated and a corresponding busy signal or message will be returned to the calling party.

Likewise, the called party may dynamically indicate that he/she does not wish to be disturbed by entering a code (such as #99) when first logging onto the data network 51. This code may set a flag in either the terminal 80, an ISP database, or the database 40, that the subscriber does not wish to be disturbed during his/her current data communication session. In this way, the called party may disable the call rerouter process for specific times when he/she is logged onto the data network 51.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for operating a call rerouting device, comprising:
   receiving a call from a calling party directed to a called party;
   first detecting whether a busy signal is received from the called party;
   second detecting whether the called party is engaging in a data call on a data network if permitted and if the busy signal is received;
   alerting the called party through the data network of the call if permitted and if the called party is engaged in the data call;
   placing a "T" connection in a connection path of the data call;
   receiving signals from the "T" connection;
   processing the signals received from the "T" connection using at least one of determining the number of zero crossings, determining the peak-to-average ratio, peak-to-min ratio and detecting data answer tones.

2. The method of claim 1, further comprising:
   offering to the called party a choice of whether to accept or reject the call;
   receiving the choice from the called party;
   returning one of a busy signal and a message to the calling party if the choice is to reject the call; and
   routing the call to the called party if the choice is to accept the call.

3. The method of claim 4, further comprising:
   offering to the called party a choice of whether to send a reply message to the calling party; and
   returning a reply message to the calling party if the choice is to send a reply message.

4. The method of claim 1, wherein the alerting step further comprises:
   determining if the called party is a subscriber to a data network;
   determining, if the called party is a subscriber, the called party's data network address; and
   sending a message to the called party's data network address.

5. The method of claim 4, wherein the message includes at least one of a dialog box, an audible message, a text message and a series of tones.

6. The method of claim 1, further comprising:
   receiving a disable command wherein, the second detecting and alerting steps are not performed when the disable command is received.

7. A call rerouting device coupled to a first communication network and a second communication network, comprising:
   a first communication interface that is coupled to the first communication network;
   a second communication interface that is coupled to the second communication network;
   a controller coupled to the first and the second communication networks, wherein the controller receives a call from a calling party directed to a called party, detects whether a busy signal is received for the called party through the first communication interface, detects whether the called party is engaged in a call on the second communication network if permitted and if the busy signal is received, and sends an alert signal to the called party through the second communication interface if the called party is engaged in a call on the second communication network, evokes a "T" connection in a connection path of the called party and receives signals from the "T" connection; and
   a signal processor that processes the signals received from the "T" connection using at least one of determining the number of zero crossings, determining the peak-to-average ratio, peak-to-min ratio and detecting data answer tones.

8. The device of claim 7, wherein the controller offers a choice to the called party to either accept or decline the call from the calling party, wherein if the called party chooses to accept the call, the controller reroutes the call through the second communication interface to the called party.

9. The device of claim 8, wherein the controller offers the called party a choice to send a reply message to the calling party, wherein the controller returns a reply message to the calling party through the first communication interface if the called party chooses to send a reply message.

10. The device of claim 7, wherein the controller determines if the called party is a subscriber to the second communication network and, if the called party is a subscriber, determines a called party's second communication network address, and wherein the alert signal is sent to the called party's second communication network address.

11. The device of claim 7, wherein the alert signal causes at least one of a dialog box, an audible message, a text message and a series of tones to be output to the called party.

12. The device of claim 7, wherein the controller does not detect whether the called party is engaged in a call on the second communication network and does not send the alert signal when a disable command is received through the first or the second communication network interfaces.

* * * * *